US012785766B2

(12) United States Patent
Huang et al.

(10) Patent No.: US 12,785,766 B2
(45) Date of Patent: Nov. 3, 2026

(54) DECOMPOSITION OF RECOMMENDED PRE-CODER CHARACTERISTICS AS CHANNEL STATE INFORMATION FEEDBACK IN MULTI-TRANSMISSION RECEPTION POINT OPERATION

(71) Applicant: QUALCOMM Incorporated, San Diego, CA (US)

(72) Inventors: Yi Huang, San Diego, CA (US); Yu Zhang, San Diego, CA (US); Hyojin Lee, San Diego, CA (US); Jing Dai, Beijing (CN); Kexin Xiao, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 18/844,008

(22) PCT Filed: Apr. 29, 2022

(86) PCT No.: PCT/CN2022/090445
§ 371 (c)(1),
(2) Date: Sep. 4, 2024

(87) PCT Pub. No.: WO2023/206412
PCT Pub. Date: Nov. 2, 2023

(65) Prior Publication Data

US 2025/0192834 A1 Jun. 12, 2025

(51) Int. Cl.
*H04B 7/0456* (2017.01)
*H04B 7/06* (2006.01)
*H04L 5/00* (2006.01)

(52) U.S. Cl.
CPC .......... *H04B 7/048* (2023.05); *H04B 7/0626* (2013.01); *H04L 5/0048* (2013.01)

(58) Field of Classification Search
CPC ...... H04B 7/024; H04B 7/048; H04B 7/0626; H04L 5/0048; H04W 8/24
See application file for complete search history.

(56) References Cited

U.S. PATENT DOCUMENTS

2015/0023193 A1* 1/2015 Zhang .................. H04L 1/0026 370/252
2019/0334587 A1* 10/2019 Rahman .............. H04B 7/0417
(Continued)

FOREIGN PATENT DOCUMENTS

CN 114223145 A 3/2022
JP 2020507950 A 3/2020
(Continued)

OTHER PUBLICATIONS

NTT Docomo, Inc., et al., "Discussion on CSI Enhancements", 3GPP TSG RAN WG1 #104-e, R1-2101603, 3rdGeneration Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051971758, 16 Pages, Type II PS codebook considering beamformed CSI-RS transmission in angle and delay, p. 7, paragraph 3.2—p. 10.
(Continued)

*Primary Examiner* — Kashif Siddiqui
(74) *Attorney, Agent, or Firm* — ArentFox Schiff LLP

(57) ABSTRACT

In a wireless network, a user equipment (UE) determines, for a channel between each such TRP and the UE, a set of channel characteristics ($H_{TRP}$). The UE then determines a set of pre-coder ($W_{TRP}$) recommendations for each such channel based on a corresponding $H_{TRP}$. The UE selectively decomposes the $W_{TRP}$ recommendations in both a spatial domain (SD) and a frequency domain (FD) into SD coefficients and FD coefficients based on one or more SD bases and one or more FD bases. Then the UE transmits the spatial
(Continued)

domain coefficients and frequency domain coefficients to the network/base station.

20 Claims, 12 Drawing Sheets

(56) References Cited

U.S. PATENT DOCUMENTS

2020/0244331 A1* 7/2020 Karri .................... H04B 7/0417
2020/0322012 A1 10/2020 Wernersson et al.
2020/0322028 A1* 10/2020 Tosato ................. H04B 7/0469
2021/0328644 A1 10/2021 Hao et al.
2023/0071931 A1* 3/2023 Huang ................... H04B 7/024
2023/0239029 A1* 7/2023 Rahman ................. H04B 7/048
370/252

FOREIGN PATENT DOCUMENTS

JP 2020517137 A 6/2020
WO 2020208297 A1 10/2020
WO 2021155485 A1 8/2021
WO 2021159462 A1 8/2021
WO 2021214713 A1 10/2021
WO 2022024042 A1 2/2022

OTHER PUBLICATIONS

Supplementary European Search Report—EP22939260—Search Authority—The Hague—Jan. 14, 2026.

VIVO: "Further Discussion and Evaluation on MTRP CSI and Partial Reciprocity", 3GPP TSG RAN WG1 #103-e, R1-2009509, e-Meeting, Oct. 26, 2020-Nov. 13, 2020, Nov. 11, 2020, 24 Pages.

International Search Report and Written Opinion—PCT/CN2022/090445—ISA/EPO—Nov. 29, 2022.

Nokia, et al., "Enhancement on CSI Measurement and Reporting", 3GPP TSG RAN WG1 Meeting #103-e, R1-2008909, Nov. 13, 2020, 21 Pages, Oct. 26, 2020-Nov. 13, 2020, The Whole Document.

VIVO: "Further Discussion and Evaluation on MTRP CSI and Partial Reciprocity", 3GPP TSG RAN WG1 #103-e, R1-2009509, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 4, 2020, XP052351420, 24 Pages, Section 3, p. 9 paragraphs 1-4, figure 4.

* cited by examiner

500

DECOMPOSITION OF RECOMMENDED PRE-CODER CHARACTERISTICS AS CHANNEL STATE INFORMATION FEEDBACK IN MULTI-TRANSMISSION RECEPTION POINT OPERATION

CLAIM OF PRIORITY UNDER 35 U.S.C. § 119

This application is a 35 U.S.C. § 371 National Stage of PCT Application No. PCT/CN2022/090445, filed on Apr. 29, 2022, entitled "DECOMPOSITION OF RECOMMENDED PRE-CODER CHARACTERISTICS AS CHANNEL STATE INFORMATION FEEDBACK IN MULTI-TRANSMISSION RECEPTION POINT OPERATION," which is assigned to the assignee hereof, and incorporated herein by reference in its entirety.

TECHNICAL FIELD

The present disclosure relates generally to communication systems, and more particularly in some examples, to decomposition of recommended pre-coder characteristics as channel state information feedback in multi-transmission reception point (M-TRP) operation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes method, apparatus, and computer-readable media including instructions for wireless communication. In aspects of the technology disclosed herein, methods, non-transitory computer readable media, and apparatuses are provided for reporting coefficients of recommended pre-coder matrices to the network/base station, and for configuring a UE for such reporting. Such technology finds use, e.g., where UEs receive coherent joint transmission from a plurality of transmission reception points (TRPs) of a network.

In examples of such technology, the UE determines, for a channel between each such TRP and the UE, a set of channel characteristics ($H_{TRP}$). The UE then determines a set of pre-coder ($W_{TRP}$) recommendations for each such channel based on a corresponding $H_{TRP}$. The UE selectively decomposes the $W_{TRP}$ recommendations in both a spatial domain (SD) and a frequency domain (FD) into SD coefficients and FD coefficients based on one or more SD bases and one or more FD bases. Then the UE transmits the spatial domain coefficients and frequency domain coefficients to the network/base station.

In some examples, selectively decomposing comprises one of: i) jointly decomposing across the $W_{TRP}$ recommendations in the SD based on a common SD basis matrix across the TRPs, and jointly decomposing across the $W_{TRP}$ recommendations in the FD based on a common FD basis matrix across the TRPs; ii) jointly decomposing across the $W_{TRP}$ recommendations in the SD based on a common SD basis matrix across the TRPs, and separately decomposing each $W_{TRP}$ recommendation in the FD based on channel-specific FD basis matrices; iii) separately decomposing each $W_{TRP}$ recommendation in the SD on channel-specific SD basis matrices, and jointly decomposing across $W_{TRP}$ recommendations in the FD based on a common FD basis matrix across the TRPs; and iv) separately decomposing each $W_{TRP}$ recommendation in the SD on channel-specific SD basis matrices, and separately decomposing each $W_{TRP}$ recommendation in the FD based on channel-specific FD basis matrices.

In some examples, the UE receives, from the network/base station and prior to the selectively decomposing, instructions for selectively decomposing $W_{TRP}$ recommendations using one of i), ii), iii), and iv). In such examples, selectively decomposing includes selectively decomposing in accordance with the received instructions. In some such examples, the instructions are received by the UE via a radio resource control (RRC) message to the UE from the network/base station.

In some examples, decomposing is selected by the UE. In some such examples, the UE selects separately decomposing each $W_{TRP}$ recommendation in the SD on channel-specific SD bases. The UE determines whether channel state information (CSI) ports for each TRP are configured in a same CSI reference signal (CSI-RS) resource. The UE selects jointly decomposing across the $W_{TRP}$ recommendations in the FD based on a common FD basis across the TRPs upon determining that CSI ports for each TRP are configured in the same CSI-RS resource; and selects separately decomposing each $W_{TRP}$ recommendation in the FD based on channel-specific FD basis upon determining that that CSI ports for each TRP are not configured in the same CSI-RS resource.

In some examples, the UE reports, to the network/base station, a capability of the UE to selectively decompose the $W_{TRP}$ recommendations in both the SD and the FD into SD coefficients and FD coefficients based on one or more SD bases and one or more FD bases.

From the perspective of the network/base station, methods, apparatus, and computer-readable media including instructions for wireless communication are included in the technology disclosed herein. In some examples, a network/base station receives, from each of a plurality of UEs receiving coherent joint transmission from a plurality of TRPs of the network, SD coefficients and FD coefficients that described a decomposed set of $W_{TRP}$ recommendations based on one or more SD bases and one or more FD bases known to both the UE and the network. The $W_{TRP}$ recommendations are based on a corresponding set of channel characteristics $H_{TRP}$ measured at the UE. The network determines, for each such UE, a pre-coder based on the received SD coefficients, the received FD coefficients, and the known bases. The network/base station then pre-codes one or more communications from the network/base station to each such UE with the corresponding determined pre-coder.

In some such examples, the network/base station transmits, to one or more such UEs, a UE-specific configuration for selectively decomposing, by the UE, $W_{TRP}$ recommendations in both the SD and the FD into SD coefficients and FD coefficients based on one or more SD bases and one or more FD bases known to both the network/base station and the one or more such UEs. In such examples, the network/base station receives subsequent SD coefficients and FD coefficients based on the transmitted UE-specific configuration. In some such examples, the transmitting includes transmitting in an RRC message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
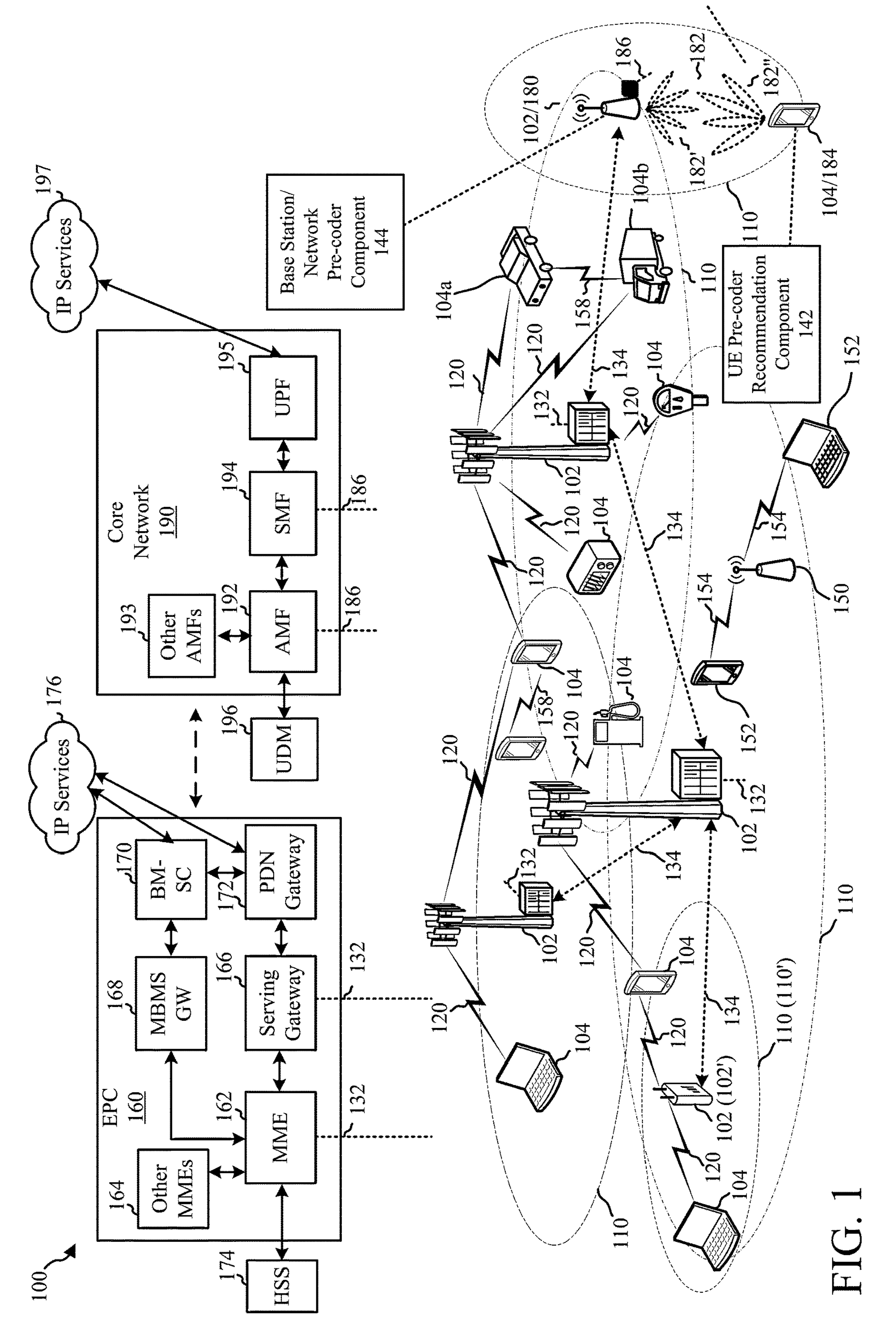
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

In wireless communications such as described herein, channel state information (CSI) characterizes how a signal propagates in the channel from the transmitter to the receiver. CSI can represent the combined effect of channel characteristics such as scattering, fading, and power attenuation. Typically, a transmitter (such as a base station, a network, a TRP) includes a CSI reference signal (CSI-RS), known to/determinable by the receiver (such as a UE), in its transmission to the receiver. The receiver uses the CSI-RS to estimate the channel characteristics. After estimation of channel characteristic at the receiver based on CSI-RS, the receiver can report channel characteristics to the transmitter. The transmitter can then pre-code subsequent transmissions to the receiver using a pre-coder based on the reported channel characteristics to improve received signal quality.

A transmission reception point (TRP) is an antenna array with one or more antenna elements available to the network located at a specific geographical location for a specific area. The use of more than one TRP—possibly in different locations or base stations, each operating over a separate physical channel, whether using one or more than one antenna of the TRP—by a network/base station to transmit to a UE receiver can be referred to as multi-TRP (M-TRP).

In some single-TRP instances, for each sub-band from the TRP, a UE can use CSI-RS to estimate a channel matrix H The UE can then derive a recommended pre-coder, described by matrix W, based on channel matrix H Instead of reporting all of W to the network/base station, the UE can take advantage of characteristics of W known to both the UE and the network/base station. In particular, W can be decomposed (compressed) by a set of spatial domain (SD) basis (beams) $W_s$. The SD basis $W_s$ is known to both the UE and the network/base station. The UE reports indices and coefficients for a set of SD basis (e.g., a selected subset from the whole set of SD basis). The coefficients can be further decomposed into common part $W_1$ for wide band (covering all sub-bands), and sub-band specific coefficient $\tilde{W}_2$ for each sub-band per Equation (1).

$$W = W_s \times W_1 \times \tilde{W}_2 \tag{1}$$

Because of the frequency domain correlation of channels across different sub-bands (1–N), the coefficients across sub-bands can be stacked into a vector/matrix—as shown by $\tilde{W}_{2,1}$-$\tilde{W}_{2,N}$ in Equation (2).

$$W(1) = W_s \times W_1 \times \tilde{W}_{2,1} \quad (2)$$

$$\ldots$$

$$W(N) = W_s \times W_1 \times \tilde{W}_{2,N}$$

The sub-band coefficients then can be further decomposed (compressed) by a set of FD bases as shown in Equation (3).

$$\tilde{W}_2' = W_t \times W_f \quad (3)$$

The UE can then report indices and coefficients for a set of FD basis (a selected subset from the whole set of SD basis) from $W_s$ and $W_f$, based on the relationships of Equation (4), where $W_1$ and $W_t$ are the SD basis matrix and the FD basis matrix, respectively. Note than each basis matrix contains one or more basis of the respective domain.

$$W_{TPR} = W_s \times W_1 \times W_t \times W_f \quad (4)$$

For M-TRP, e.g., coherent joint transmission (CJT) with M-TRP over a plurality of channels, different channels can be characterized by different channel matrices $H_{TRP}$. In aspects of the technology disclosed herein, methods, non-transitory computer readable media, and apparatuses are provided for reporting recommended pre-coder matrices $W_{TRP}$ to the network/base station, and for configuring a UE for such reporting. Such technology finds use where UEs receive transmissions from a plurality of transmission reception points (TRPs) of a network/base station.

In examples of such technology, the UE determines, for a channel between each such TRP and the UE, a set of channel characteristics $H_{TRP}$. The UE then determines a set of pre-coder ($W_{TRP}$) recommendations for each such channel based on a corresponding $H_{TRP}$. The UE selectively decomposes the $W_{TRP}$ recommendations in both a spatial domain (SD) and a frequency domain (FD) into SD coefficients and FD coefficients based on one or more SD bases and one or more FD bases. Then the UE transmits the spatial domain coefficients and frequency domain coefficients to the network/base station.

In some examples, selectively decomposing comprises one of: i) jointly decomposing across the $W_{TRP}$ recommendations in the SD based on a common SD basis matrix across the TRPs, and jointly decomposing across the $W_{TRP}$ recommendations in the FD based on a common FD basis matrix across the TRPs; ii) jointly decomposing across the $W_{TRP}$ recommendations in the SD based on a common SD basis matrix across the TRPs, and separately decomposing each $W_{TRP}$ recommendation in the FD based on channel-specific FD basis matrices; iii) separately decomposing each $W_{TRP}$ recommendation in the SD on channel-specific SD basis matrices, and jointly decomposing across $W_{TRP}$ recommendations in the FD based on a common FD basis matrix across the TRPs; and iv) separately decomposing each $W_{TRP}$ recommendation in the SD on channel-specific SD basis matrices, and separately decomposing each $W_{TRP}$ recommendation in the FD based on channel-specific FD basis matrices.

In some examples, the UE receives, from the network/base station and prior to the selectively decomposing, instructions for selectively decomposing $W_{TRP}$ recommendations using one of i), ii), iii), and iv). In such examples, selectively decomposing includes selectively decomposing in accordance with the received instructions. In some such examples, the instructions are received by the UE via a radio resource control (RRC) message to the UE from the network/base station.

In some examples, decomposing is selected by the UE. In some such examples, the UE selects separately decomposing each $W_{TRP}$ recommendation in the SD on channel-specific SD bases. The UE determines whether CSI ports for each TRP are configured in a same CSI-RS resource. The UE selects jointly decomposing across the $W_{TRP}$ recommendations in the FD based on a common FD basis across the TRPs upon determining that CSI ports for each TRP are configured in the same CSI-RS resource; and selects separately decomposing each $W_{TRP}$ recommendation in the FD based on channel-specific FD basis upon determining that that CSI ports for each TRP are not configured in the same CSI-RS resource.

In some examples, the UE reports, to the network/base station, a capability of the UE to selectively decompose the $W_{TRP}$ recommendations in both the SD and the FD into SD coefficients and FD coefficients based on one or more SD bases and one or more FD bases.

From the perspective of the network/base station, methods, apparatus, and computer-readable media including instructions for wireless communication are included in the technology disclosed herein. In some examples, a network/base station receives, from each of a plurality of UEs receiving transmissions from a plurality of TRPs of the network, spatial domain (SD) coefficients and frequency domain (FD) coefficients that described a decomposed set of pre-coder ($W_{TRP}$) recommendations based on one or more SD bases and one or more FD bases known to both the UE and the network/base station. The $W_{TRP}$ recommendations are based on a corresponding set of channel characteristics $H_{TRP}$ measured at the UE. The network/base station determines, for each such UE, a pre-coder based on the received SD coefficients, the received FD coefficients, and the known bases. The network/base station then pre-codes one or more communications from the network to each such UE with the corresponding determined pre-coder.

In some such examples, the network/base station transmits, to one or more such UEs, a UE-specific configuration for selectively decomposing, by the UE, $W_{TRP}$ recommendations in both the SD and the FD into SD coefficients and FD coefficients based on one or more SD bases and one or more FD bases known to both the network/base station and the one or more such UEs. In such examples, the network receives subsequent SD coefficients and FD coefficients based on the transmitted UE-specific configuration. In some such examples, the transmitting includes transmitting in an RRC message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. In some examples of the technology disclosed herein, both the DL and the UL between the base station and a UE use the same set of multiple beams to transmit/receive physical channels. For example, a given set of beams can carry the multiple copies of a Physical Downlink Shared Channel (PDSCH) on the DL and can carry multiple copies of a Physical Uplink Control Channel (PUCCH) on the UL.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

In aspects of the technology disclosed herein, methods, non-transitory computer readable media, and apparatuses are provided for reporting recommended pre-coder matrices $W_{TRP}$ to the network/base station, and for configuring a UE 104 for such reporting. Such technology finds use where UEs 104 receive transmissions from a plurality of transmission reception points (TRPs) of a network/base station 102.

In examples of such technology, such as UE pre-coder recommendation component 142, the UE 104 determines, for a channel between each such TRP and the UE 104, a set of channel characteristics $H_{TRP}$. The UE 104 then determines a set of pre-coder ($W_{TRP}$) recommendations for each such channel based on a corresponding $H_{TRP}$. The UE 104 selectively decomposes the $W_{TRP}$ recommendations in both a spatial domain (SD) and a frequency domain (FD) into SD coefficients and FD coefficients based on one or more SD bases and one or more FD bases. Then the UE 104 transmits the spatial domain coefficients and frequency domain coefficients to the network/base station 102.

In some examples, selectively decomposing comprises one of: i) jointly decomposing across the $W_{TRP}$ recommendations in the SD based on a common SD basis matrix across the TRPs, and jointly decomposing across the $W_{TRP}$ recommendations in the FD based on a common FD basis matrix across the TRPs; ii) jointly decomposing across the $W_{TRP}$ recommendations in the SD based on a common SD basis matrix across the TRPs, and separately decomposing each $W_{TRP}$ recommendation in the FD based on channel-specific FD basis matrices; iii) separately decomposing each $W_{TRP}$ recommendation in the SD on channel-specific SD basis matrices, and jointly decomposing across $W_{TRP}$ recommendations in the FD based on a common FD basis matrix across the TRPs; and iv) separately decomposing each $W_{TRP}$ recommendation in the SD on channel-specific SD basis matrices, and separately decomposing each $W_{TRP}$ recommendation in the FD based on channel-specific FD basis matrices.

In some examples, the UE 104 receives, from the network/base station 102 and prior to the selectively decomposing, instructions for selectively decomposing $W_{TRP}$ recommendations using one of i), ii), iii), and iv). In such examples, selectively decomposing includes selectively decomposing in accordance with the received instructions. In some such examples, the instructions are received by the UE 104 via an RRC message to the UE from the network/base station 102.

In some examples, decomposing is selected by the UE 104. In some such examples, the UE 104 selects separately decomposing each $W_{TRP}$ recommendation in the SD on channel-specific SD bases. The UE 104 determines whether CSI ports for each TRP (e.g., at base stations such as base station 102) are configured in a same CSI-RS resource. The UE 104 selects jointly decomposing across the $W_{TRP}$ recommendations in the FD based on a common FD basis across the TRPs upon determining that CSI ports for each TRP are configured in the same CSI-RS resource; and selects separately decomposing each $W_{TRP}$ recommendation in the FD based on channel-specific FD basis upon determining that that CSI ports for each TRP are not configured in the same CSI-RS resource.

In some examples, the UE 104 reports, to the network, a capability of the UE 104 to selectively decompose the $W_{TRP}$ recommendations in both the SD and the FD into SD coefficients and FD coefficients based on one or more SD bases and one or more FD bases.

The wireless communications system may further include a Wi-Fi access point (AP) in communication with Wi-Fi stations (STAs) 152 via communication links 154 in a 5 GHz unlicensed frequency spectrum. When communicating in an unlicensed frequency spectrum, the STAs 152/AP may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in one or more frequency bands within the electromagnetic spectrum. The base station 180 and the UE 104 may each include a plurality of antennas, such as antenna elements, antenna panels, and/or antenna arrays to facilitate the beamforming.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming with the UE 104/184 to compensate for the path loss and short-range using beams 182.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

From the perspective of the network/base station 102, methods, apparatus, and computer-readable media including instructions for wireless communication are included in the technology disclosed herein. In some examples, a network/base station 102 receives, from each of a plurality of UEs 104 receiving transmissions from a plurality of TRPs of the network/base station 102, spatial domain (SD) coefficients and frequency domain (FD) coefficients that described a decomposed set of pre-coder ($W_{TRP}$) recommendations based on one or more SD bases and one or more FD bases known to both the UE 104 and the network/base station 102. The $W_{TRP}$ recommendations are based on a corresponding set of channel characteristics $H_{TRP}$ measured at the UE 104. The network/base station 102 determines, for each such UE 104, a pre-coder based on the received SD coefficients, the received FD coefficients, and the known bases. The network base station 102 then pre-codes one or more communications from the network base station 102 to each such UE 104 with the corresponding determined pre-coder.

In some such examples, the network/base station 102 transmits, to one or more such UEs 104, a UE-specific configuration for selectively decomposing, by the UE 104, $W_{TRP}$ recommendations in both the SD and the FD into SD coefficients and FD coefficients based on one or more SD bases and one or more FD bases known to both the network/base station 102 and the one or more such UEs 104. In such examples, the network receives subsequent SD coefficients and FD coefficients based on the transmitted UE-specific configuration. In some such examples, the transmitting includes transmitting in an RRC message.

Although the following description may be focused on 5G NR, the concepts described herein may be applicable to other similar areas, such as LTE, LTE-A, CDMA, GSM, and other wireless technologies.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
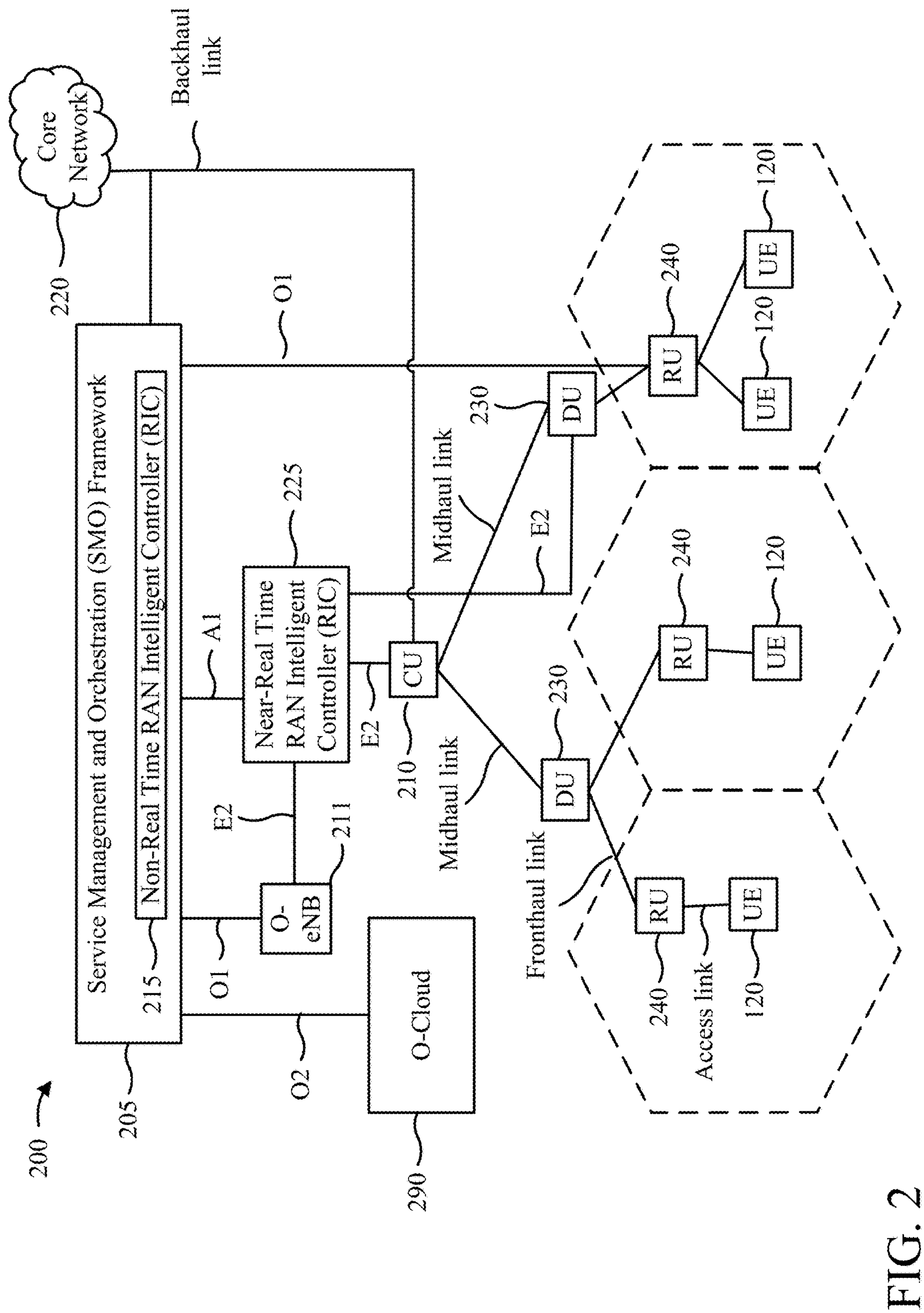
FIG. 2 is a diagram illustrating an example disaggregated base station architecture

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figures 3A, 3B, 3C, 3D:
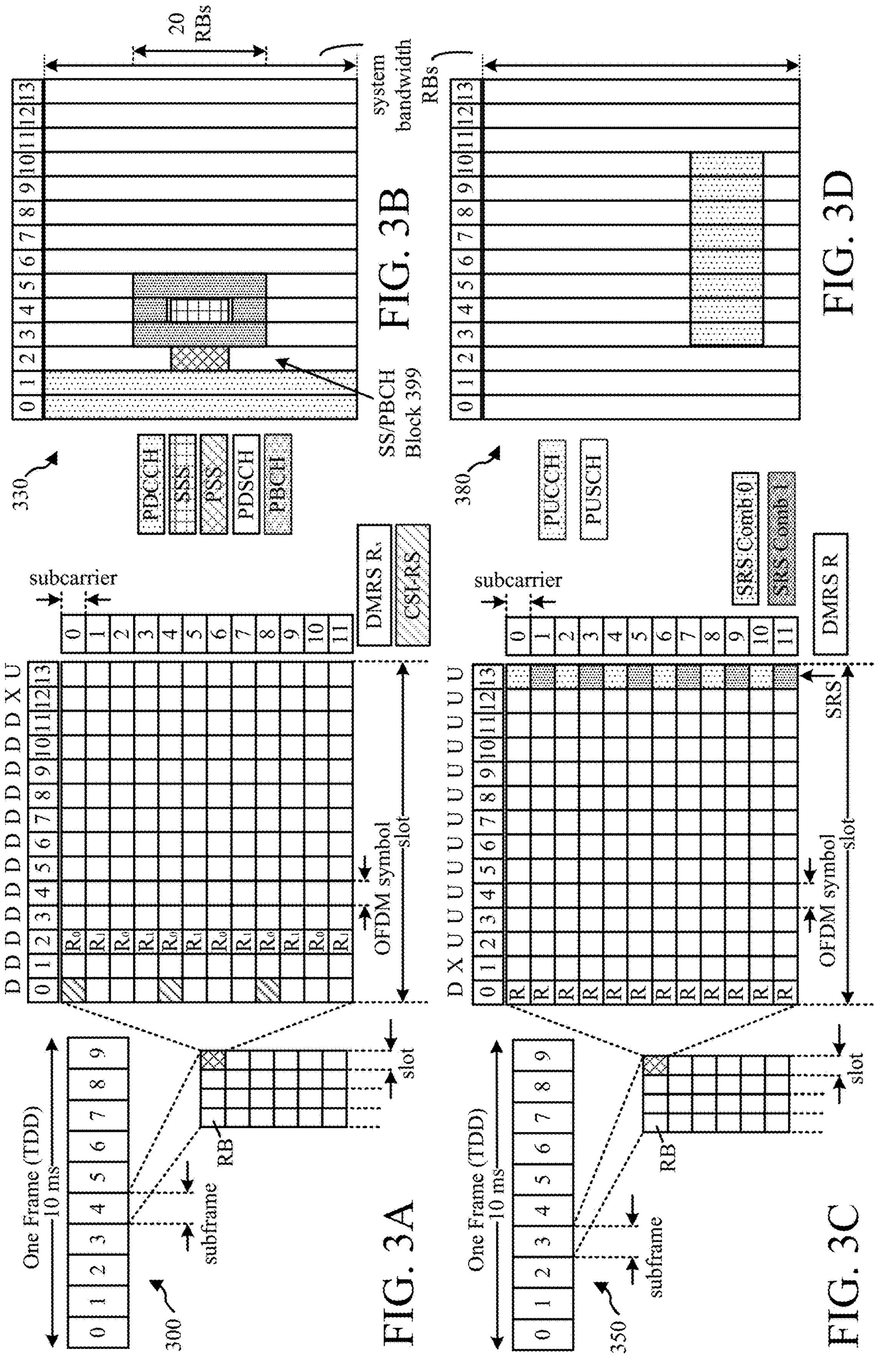
FIG. 3A, FIG. 3B, FIG. 3C, and FIG. 3D are diagrams illustrating examples of a first 5G/NR frame, DL channels within a 5G/NR subframe, a second 5G/NR frame, and UL channels within a 5G/NR subframe, respectively.

FIG. 3A is a diagram 300 illustrating an example of a first subframe within a 5G/NR frame structure. FIG. 3B is a diagram 330 illustrating an example of DL channels within a 5G/NR subframe. FIG. 3C is a diagram 350 illustrating an example of a second subframe within a 5G/NR frame structure. FIG. 3D is a diagram 380 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a pre-coding matrix indicator (PMI), a rank indicator (RI), and hybrid automatic repeat request (HARQ) acknowledgment (ACK)/negative ACK (NACK) feedback. The PUSCH carries data and may additionally be used to carry a buffer status report (BSR), a power headroom report (PHR), and/or UCI.

Figure 4:
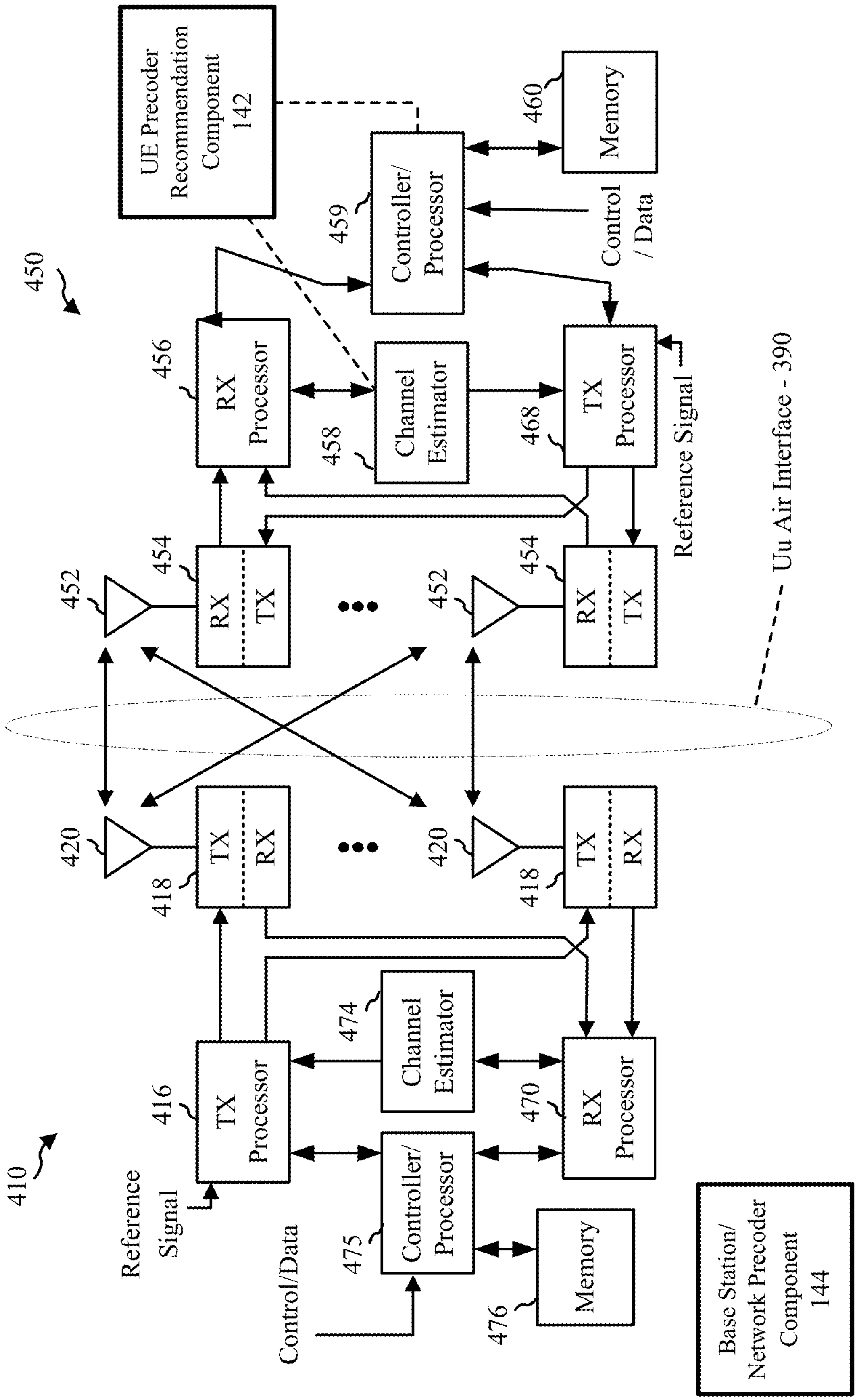
FIG. 4 is a diagram illustrating a base station and user equipment (UE) in an access network, in accordance with examples of the technology disclosed herein.

FIG. 4 is a block diagram of a base station 410 in communication with a UE 450 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate a radio frequency (RF) carrier with a respective spatial stream for transmission.

From the perspective of the base station 410, methods, apparatus, and computer-readable media including instructions for wireless communication are included in the technology disclosed herein. In some examples, a base station 410 receives, from each of a plurality of UEs 450 receiving transmissions from a plurality of TRPs of the base station 410, spatial domain (SD) coefficients and frequency domain (FD) coefficients that described a decomposed set of pre-coder ($W_{TRP}$) recommendations based on one or more SD bases and one or more FD bases known to both the UE 450 and the base station 410. The $W_{TRP}$ recommendations are based on a corresponding set of channel characteristics $H_{TRP}$ measured at the UE 450. The base station 410 determines, for each such UE 450, a pre-coder based on the received SD coefficients, the received FD coefficients, and the known bases. The base station 410 then pre-codes one or more communications from the base station 410 (e.g., from a TRP associated therewith) to each such UE 450 with the corresponding determined pre-coder.

In some such examples, the base station 410 transmits, to one or more such UEs 450, a UE-specific configuration for selectively decomposing, by the UE 450, $W_{TRP}$ recommendations in both the SD and the FD into SD coefficients and FD coefficients based on one or more SD bases and one or more FD bases known to both the base station 410 and the one or more such UEs 450. In such examples, the base station 410 receives subsequent SD coefficients and FD coefficients based on the transmitted UE-specific configuration. In some such examples, the transmitting includes transmitting in a radio resource configuration (RRC) message.

Base station 410 can perform the above-described operation using base station/network pre-coder component 144 in cooperation with, or hosted in, one or more of TX processor 416, RX processor 470, channel estimator 474, controller/processor 475, and memory 476.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations. As described elsewhere herein, the interface between a UE 450 and a base station 410 can be referred to as a "Uu" interface 490.

Continuing to refer to FIG. 4, and continuing to refer to prior figures for context, in certain aspects, the technology disclosed herein is method, apparatus, and computer-readable media including instructions for wireless communication. In aspects of the technology disclosed herein, methods, non-transitory computer readable media, and apparatuses are provided for reporting recommended pre-coder matrices $W_{TRP}$ to the network/base station, and for configuring a UE 450 for such reporting. Such technology finds use where UEs 450 receive transmissions from a plurality of TRPs of a network/base station 410.

In examples of such technology, such as UE pre-coder recommendation component 142, the UE 450 determines, for a channel between each such TRP of a base station 410 and the UE 450, a set of channel characteristics $H_{TRP}$. The UE 450 then determines a set of pre-coder ($W_{TRP}$) recommendations for each such channel based on a corresponding $H_{TRP}$. The UE 450 selectively decomposes the $W_{TRP}$ recommendations in both a spatial domain (SD) and a frequency domain (FD) into SD coefficients and FD coefficients based on one or more SD bases and one or more FD bases. Then the UE 450 transmits the spatial domain coefficients and frequency domain coefficients to the base station 410.

In some examples, selectively decomposing comprises one of: i) jointly decomposing across the $W_{TRP}$ recommendations in the SD based on a common SD basis matrix across the TRPs, and jointly decomposing across the $W_{TRP}$ recommendations in the FD based on a common FD basis matrix across the TRPs; ii) jointly decomposing across the $W_{TRP}$ recommendations in the SD based on a common SD basis matrix across the TRPs, and separately decomposing each $W_{TRP}$ recommendation in the FD based on channel-specific FD basis matrices; iii) separately decomposing each $W_{TRP}$ recommendation in the SD on channel-specific SD basis matrices, and jointly decomposing across $W_{TRP}$ recommendations in the FD based on a common FD basis matrix across the TRPs; and iv) separately decomposing each $W_{TRP}$ recommendation in the SD on channel-specific SD basis matrices, and separately decomposing each $W_{TRP}$ recommendation in the FD based on channel-specific FD basis matrices.

In some examples, the UE 450 receives, from the base station 410 (e.g., over a channel from a TRP) and prior to the selectively decomposing, instructions for selectively decomposing $W_{TRP}$ recommendations using one of i), ii), iii), and iv). In such examples, selectively decomposing includes selectively decomposing in accordance with the received instructions. In some such examples, the instructions are received by the UE 450 via a radio resource control (RRC) message to the UE from the base station 410.

In some examples, decomposing is selected by the UE 450. In some such examples, the UE 450 selects separately decomposing each $W_{TRP}$ recommendation in the SD on channel-specific SD bases. The UE 450 determines whether CSI ports for each TRP (e.g., at base stations such as base station 410) are configured in a same CSI-RS resource. The UE 450 selects jointly decomposing across the $W_{TRP}$ recommendations in the FD based on a common FD basis across the TRPs upon determining that CSI ports for each TRP are configured in the same CSI-RS resource; and selects separately decomposing each $W_{TRP}$ recommendation in the FD based on channel-specific FD basis upon determining that that CSI ports for each TRP are not configured in the same CSI-RS resource.

In some examples, the UE 450 reports, to the base station 410, a capability of the UE 450 to selectively decompose the $W_{TRP}$ recommendations in both the SD and the FD into SD coefficients and FD coefficients based on one or more SD bases and one or more FD bases.

UE 450 can perform the above-described operation using UE pre-coder component 142 in cooperation with, or hosted in, one or more of TX processor 468, RX processor 456, channel estimator 458, controller/processor 459, and memory 460.

Figure 5:
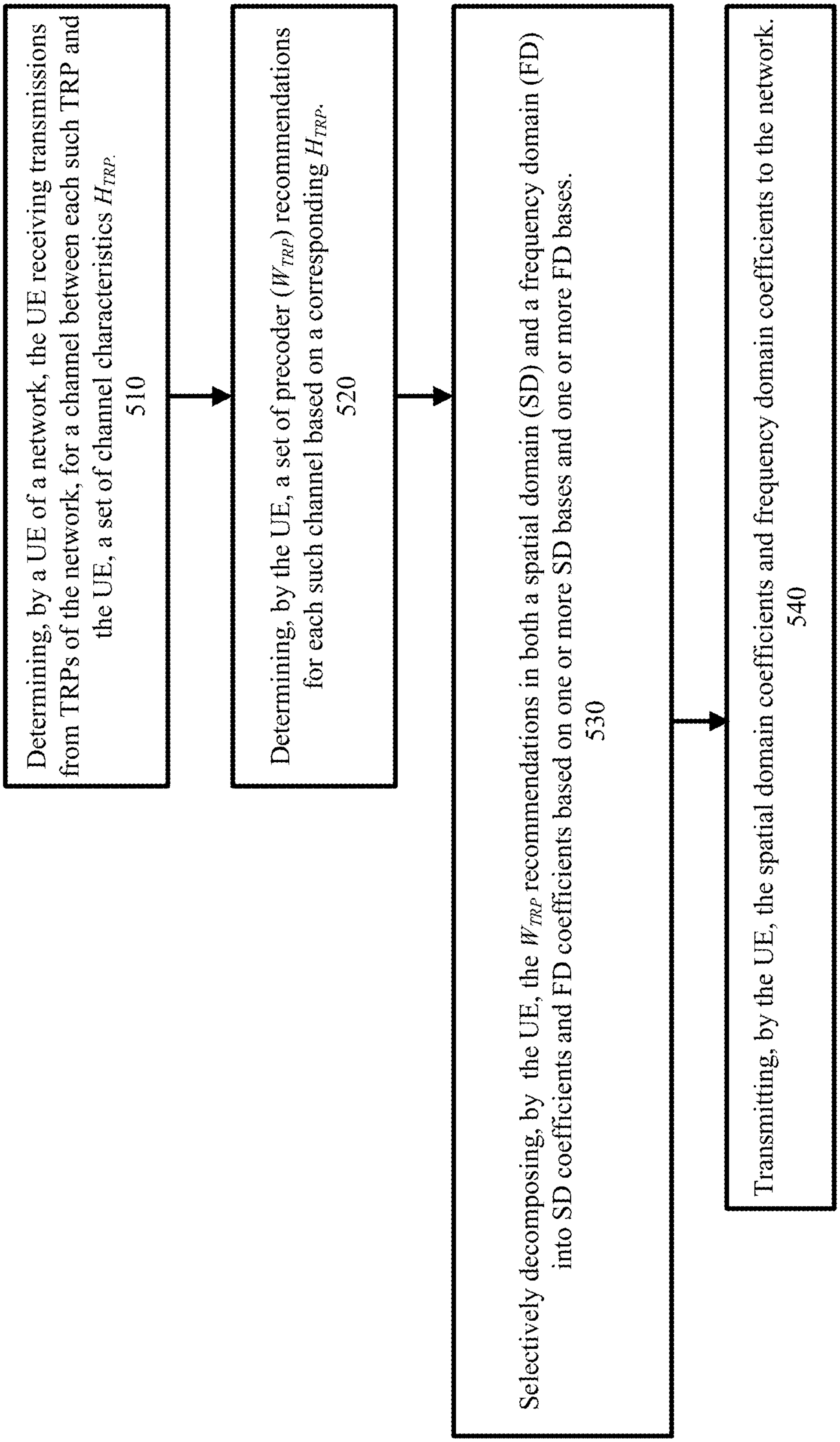
FIG. 5 is a flow diagram illustrating methods of wireless communication, in accordance with examples of the technology disclosed herein.

Referring to FIG. 5, and continuing to refer to prior figures for context, methods 500 for wireless communication are illustrated, in accordance with examples of the technology disclosed herein. In such methods, a UE of a network is receiving transmissions from TRPs of the network. The UE determines, for a channel between each such TRP and the UE, a set of channel characteristics $H_{TRP}$—Block 510. In a continuing example, UE 450 is receiving coherent joint transmission from TRPs of a network across several base stations 410. The UE uses channel estimator 458 to determine a set of channel characteristics $H_{TRP}$ for each channel between the UE 450 and a TRP based on receiving CSI-RS from a TRP of the base station 410.

Figure 9:
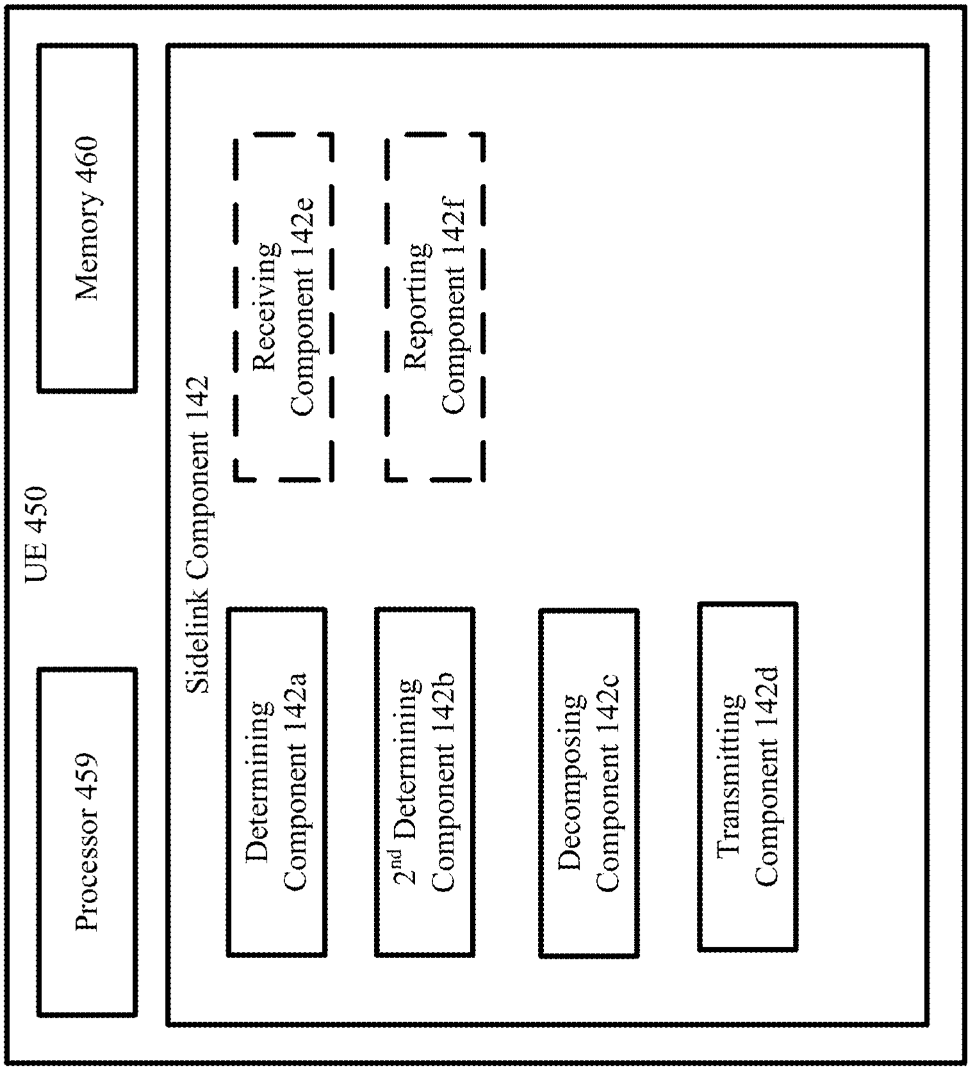
FIG. 9 is a block diagram of a UE, in accordance with examples of the technology disclosed herein.

Referring to FIG. 9, and continuing to refer to prior figures for context, another representation of the UE 450 (such as UE 104*a*) for wireless communication is shown, in accordance with examples of the technology disclosed herein. UE 450 includes UE pre-coder recommendation component 142, controller/processor 459, and memory 460, as described in conjunction with FIG. 4 above. UE pre-coder recommendation component 142 includes determining component 142*a*. In some examples, the determining component 142*a* determines, for a channel between each such TRP and the UE, a set of channel characteristics $H_{TRP}$. Accordingly, determining component 142*a* may provide means for determining, for a channel between each such TRP and the UE, a set of channel characteristics $H_{TRP}$.

Referring again to FIG. 5, the UE determines a set of pre-coder ($W_{TRP}$) recommendations for each such channel based on a corresponding $H_{TRP}$—Block 520. In the continuing example the UE 450 determines the vector shown in Equation (5) based on $H_{TRP}$.

$$\begin{bmatrix} W_{TPR1} \\ W_{TPR2} \end{bmatrix} \tag{5}$$

Referring to FIG. 9, and continuing to refer to prior figures for context, UE pre-coder recommendation component 142 includes $2^{nd}$ determining component 142*b*. In some examples, the $2^{nd}$ determining component 142*b* determines a set of $W_{TRP}$ recommendations for each such channel based on a corresponding $H_{TRP}$. Accordingly, $2^{nd}$ determining component 142*b* may provide means for determining a set of pre-coder $W_{TRP}$ recommendations for each such channel based on a corresponding $H_{TRP}$.

Referring again to FIG. 5, the UE selectively decomposes the $W_{TRP}$ recommendations in both a spatial domain (SD) and a frequency domain (FD) into SD coefficients and FD coefficients based on one or more SD bases and one or more FD bases—Block 530. In the continuing example, the UE 450 jointly decomposes across the $W_{TRP}$ recommendations in the SD based on a common SD basis matrix across the TRPs, and jointly decomposes across the $W_{TRP}$ recommendations in the FD based on a common FD basis matrix across the TRPs—as shown in Equation (6). While in practice SD decomposition is often done first, this order is not necessary.

$$\begin{bmatrix} W_{TPR1} \\ W_{TPR2} \end{bmatrix} = W_s \times \begin{bmatrix} W_{1,TPR1} & 0 \\ 0 & W_{1,TPR2} \end{bmatrix} \times \begin{bmatrix} W_{t,TPR1} \\ W_{t,TPR2} \end{bmatrix} \times W_f \tag{6}$$

In Equation (6), $W_s$ is a common set of spatial domain (SD) bases applied to both TRPs; $W_{1,TPR1}$ and $W_{1,TPR2}$ are wideband SD coefficients for TRP1 and TRP2, respectively; $W_{t,TPR1}$ and $W_{t,TPR2}$ are sub-band frequency domain (FD) coefficients for TRP1 and TRP2, respectively; and $W_f$ is a common set of FD bases applied to both TRPs.

Referring to FIG. 9, and continuing to refer to prior figures for context, UE pre-coder recommendation component 142 includes decomposing component 142*c*. In some examples, the decomposing component 142*c* selectively decomposes the $W_{TRP}$ recommendations in both a spatial domain (SD) and a frequency domain (FD) into SD coefficients and FD coefficients based on one or more SD bases and one or more FD bases. Accordingly, decomposing component 142*c* may provide means for selectively decomposing the $W_{TRP}$ recommendations in both SD and FD into SD coefficients and FD coefficients based on one or more SD bases and one or more FD bases.

Referring again to FIG. 5, the UE transmits the spatial domain coefficients and frequency domain coefficients to the network—Block 530. In the continuing example, the UE 450 transmits $\{W_{1,TPR1}, W_{1,TPR2}, W_{t,TPR1}, W_{t,TPR2}\}$ to the base station 410 as representing the vector of Equation (5) since $W_s$ and $W_f$ are already known to the base station 410. The base station can then reconstruct the vector of recommendations of Equation (5).

Referring to FIG. 9, and continuing to refer to prior figures for context, UE pre-coder recommendation component 142 includes transmitting component 142*d*. In some examples, the transmitting component 142*d* transmits the spatial domain coefficients and frequency domain coefficients to the network. Accordingly, transmitting component 142*d* may provide means for transmitting the spatial domain coefficients and frequency domain coefficients to the network.

In some examples, instead of the UE 450 decomposing as described in the continuing example, the UE 450 can jointly decompose across the $W_{TRP}$ recommendations in the SD based on a common SD basis matrix across the TRPs, and separately decompose each $W_{TRP}$ recommendation in the FD based on channel-specific FD basis matrices—as per Equation (7).

$$\begin{bmatrix} W_{TPR1} \\ W_{TPR2} \end{bmatrix} = W_s \times \begin{bmatrix} W_{1,TPR1} & 0 \\ 0 & W_{1,TPR2} \end{bmatrix} \times \begin{bmatrix} W_{t,TPR1} & 0 \\ 0 & W_{t,TPR2} \end{bmatrix} \times \begin{bmatrix} W_{f,TPR1} \\ W_{f,TPR2} \end{bmatrix} \tag{7}$$

In Equation (7), $W_s$ is a common set of SD bases applied to both TRPs; $W_{1,TPR1}$ and $W_{1,TPR2}$ are wideband SD coefficients for TRP1 and TRP2, respectively; $W_{t,TPR1}$ and $W_{t,TPR2}$ are sub-band frequency domain (FD) coefficients for TRP1 and TRP2, respectively; and $W_{f,TPR1}$ and $W_{f,TPR2}$ are separate FD bases for TRP1 and TRP2, respectively.

In some examples, instead of the UE 450 decomposing as described above, the UE 450 can separately decompose each $W_{TRP}$ recommendation in the SD on channel-specific SD basis matrices, and jointly decompose across $W_{TRP}$ recommendations in the FD based on a common FD basis matrix across the TRPs—as per Equation (8).

$$\begin{bmatrix} W_{TPR1} \\ W_{TPR2} \end{bmatrix} = \begin{bmatrix} W_{s,TPR1} & 0 \\ 0 & W_{s,TPR2} \end{bmatrix} \times \begin{bmatrix} W_{1,TPR1} & 0 \\ 0 & W_{1,TPR2} \end{bmatrix} \times \begin{bmatrix} W_{t,TPR1} \\ W_{t,TPR2} \end{bmatrix} \times W_f \tag{8}$$

In Equation (8), $W_{s,TPR1}$ and $W_{s,TPR2}$ are SD bases for TRP1 and TRP2, respectively; $W_{1,TPR1}$ and $W_{1,TPR2}$ are wideband SD coefficients for TRP1 and TRP2, respectively; $W_{t,TPR1}$ and $W_{t,TPR2}$ are sub-band frequency domain (FD) coefficients for TRP1 and TRP2, respectively; and $W_f$ is a common set of FD basis applied to both TRPs.

In some examples, instead of the UE 450 decomposing as described above, the UE 450 can separately decompose each $W_{TRP}$ recommendation in the SD on channel-specific SD basis matrices, and separately decomposing each $W_{TRP}$ recommendation in the FD based on channel-specific FD basis matrices—as per Equation (9).

$$\begin{bmatrix} W_{TPR1} \\ W_{TPR2} \end{bmatrix} = \begin{bmatrix} W_{s,TPR1} & 0 \\ 0 & W_{s,TPR2} \end{bmatrix} \times \begin{bmatrix} W_{1,TPR1} & 0 \\ 0 & W_{1,TPR2} \end{bmatrix} \times \begin{bmatrix} W_{t,TPR1} \\ W_{t,TPR2} \end{bmatrix} \times \begin{bmatrix} W_{f,TPR1} \\ W_{f,TPR2} \end{bmatrix} \quad (7)$$

In Equation (9), $W_{s,TPR1}$ and $W_{s,TPR2}$ are SD bases for TRP1 and TRP2, respectively; $W_{1,TPR1}$ and $W_{1,TPR2}$ are wideband SD coefficients for TRP1 and TRP2, respectively; $W_{t,TPR1}$ and $W_{t,TPR2}$ are sub-band frequency domain (FD) coefficients for TRP1 and TRP2, respectively; and $W_{f,TPR1}$ and $W_{f,TPR2}$ are separate FD bases for TRP1 and TRP2, respectively.

In other examples, rather than first determining a full $W_{TRP}$ recommendation from $H_{TRP}$ and then decomposing, the UE can determine, for each channel, a set of spatial domain (SD) coefficients and frequency domain (FD) coefficients directly as pre-coder ($W_{TRP}$) recommendations for each such channel based on both i) a corresponding $H_{TRP}$, and ii) on one or more SD bases and one or more FD bases known to the UE and to the network.

Figure 6:
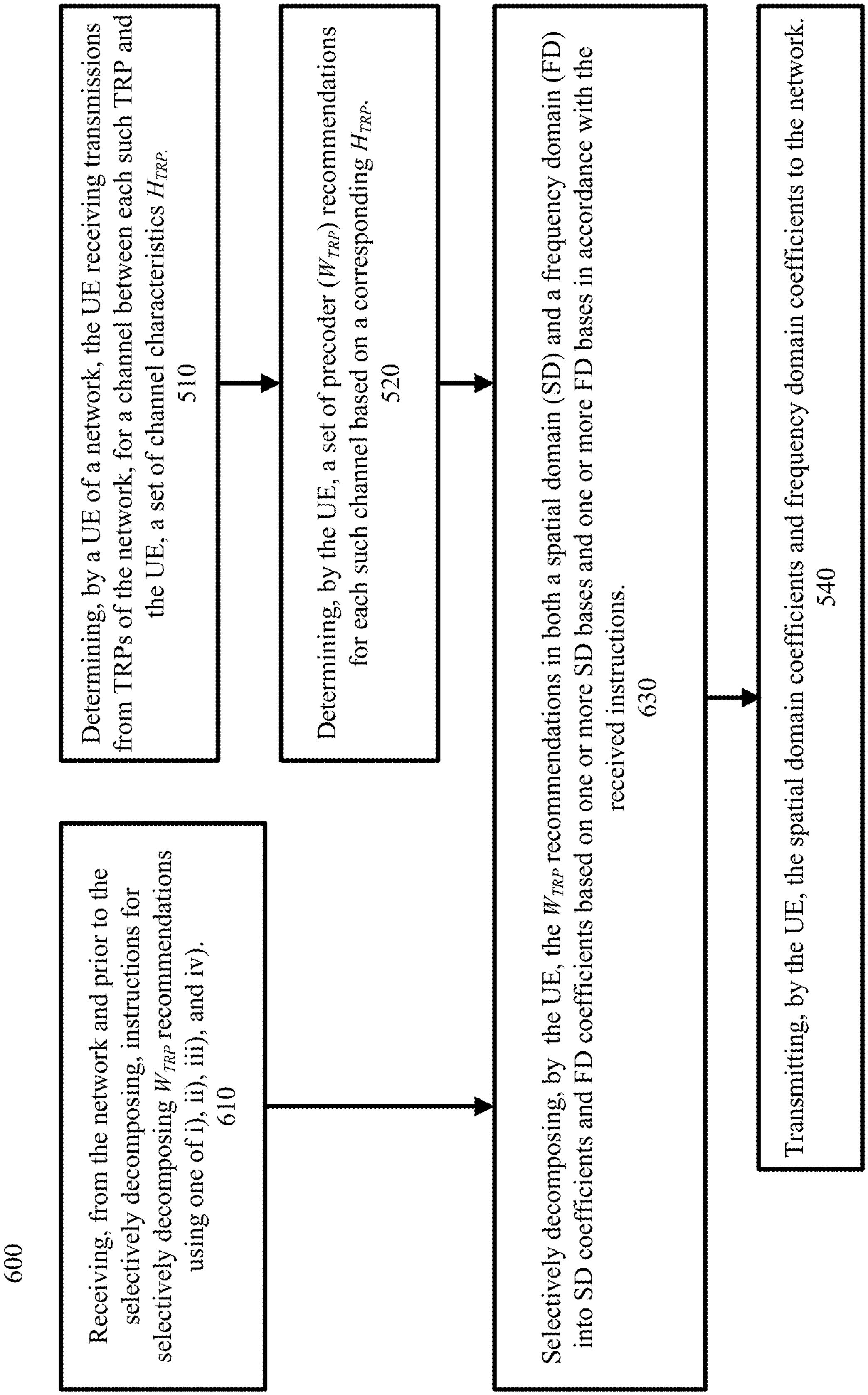
FIG. 6 is a flow diagram illustrating methods of wireless communication, in accordance with examples of the technology disclosed herein.

Referring to FIG. 6, and continuing to refer to prior figures for context, methods 600 for wireless communication are illustrated, in accordance with examples of the technology disclosed herein. In such methods, Block 510, Block 520, and Block 540 are performed as described above in connection with FIG. 5. In such methods, the UE receives, from the network and prior to the selectively decomposing, instructions for selectively decomposing $W_{TRP}$ recommendations using one of i), ii), iii), and iv)—Block 610. In a variation on the continuing example, the UE 450 received instructions via RRC message from the base station 410 to jointly decomposes across the $W_{TRP}$ recommendations in the SD based on a common SD basis matrix across the TRPs, and jointly decomposes across the $W_{TRP}$ recommendations in the FD based on a common FD basis matrix across the TRPs—as shown in Equation (6).

Referring to FIG. 9, and continuing to refer to prior figures for context, UE pre-coder recommendation component 142 includes receiving component 142*e*. In some examples, the receiving component 142*e* receives, from the network and prior to the selectively decomposing, instructions for selectively decomposing $W_{TRP}$ recommendations using one of i), ii), iii), and iv). Accordingly, receiving component 142*e* may provide means for receiving, from the network and prior to the selectively decomposing, instructions for selectively decomposing $W_{TRP}$ recommendations using one of i), ii), iii), and iv).

Referring again to FIG. 6, the UE selectively decomposes the $W_{TRP}$ recommendations in both a spatial domain (SD) and a frequency domain (FD) into SD coefficients and FD coefficients based on one or more SD bases and one or more FD bases in accordance with the received instructions—Block 630. In the continuing example, the UE 450 jointly decomposes across the $W_{TRP}$ recommendations in the SD based on a common SD basis matrix across the TRPs, and jointly decomposes across the $W_{TRP}$ recommendations in the FD based on a common FD basis matrix across the TRPs in accordance with the received instructions—as shown in Equation (6).

Referring to FIG. 9, and continuing to refer to prior figures for context, UE pre-coder recommendation component 142 includes decomposing component 142*c*. In some examples, the decomposing component 142*c* selectively decomposes the $W_{TRP}$ recommendations in both a spatial domain (SD) and a frequency domain (FD) into SD coefficients and FD coefficients based on one or more SD bases and one or more FD bases in accordance with the received instructions. Accordingly, decomposing component 142*c* may provide means for selectively decomposing the $W_{TRP}$ recommendations in both SD and FD into SD coefficients and FD coefficients based on one or more SD bases and one or more FD bases in accordance with the received instructions.

Figure 7:
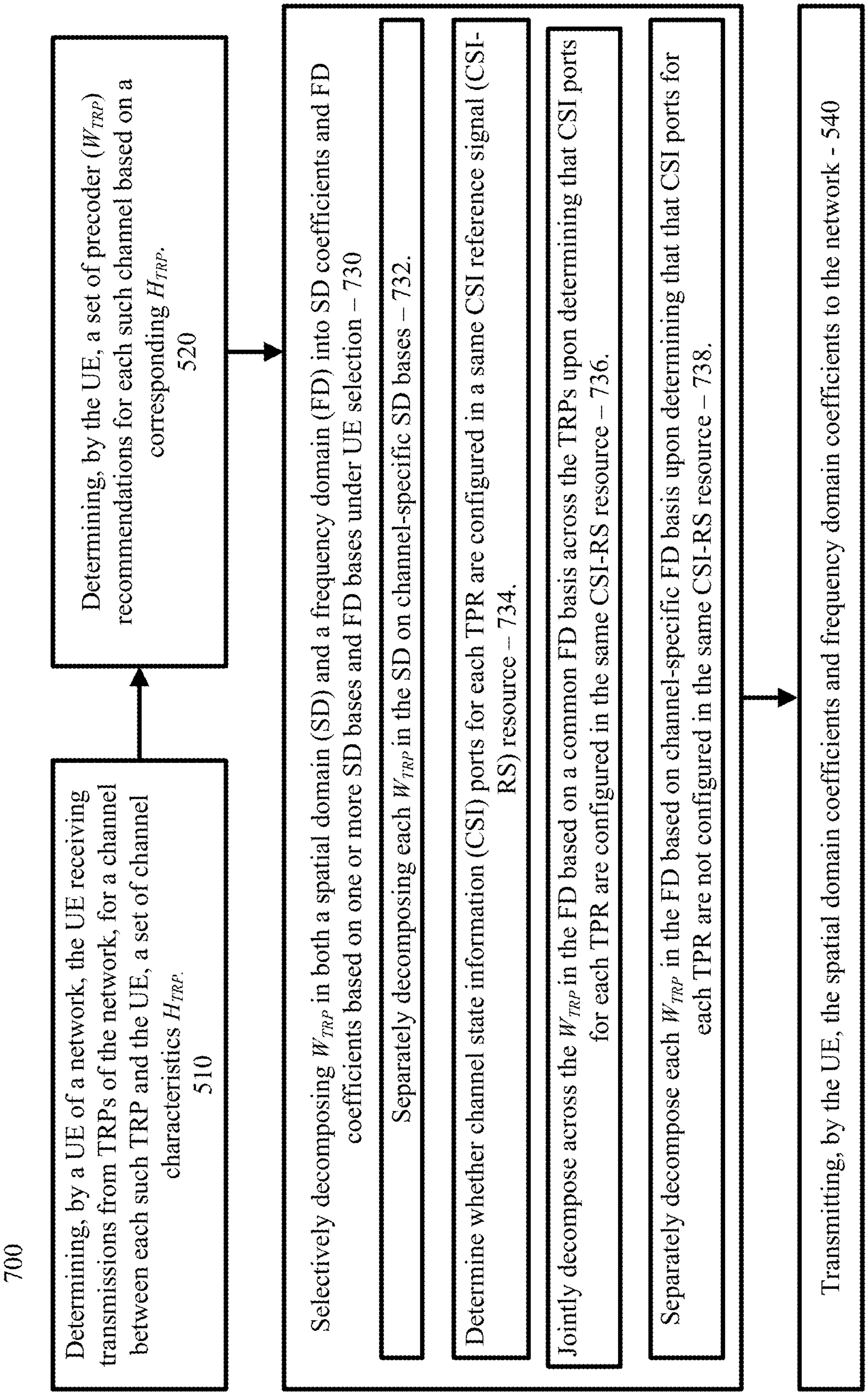
FIG. 7 is a flow diagram illustrating methods of wireless communication, in accordance with examples of the technology disclosed herein.

Referring to FIG. 7 and continuing to refer to prior figures for context, methods 700 for wireless communication are illustrated, in accordance with examples of the technology disclosed herein. In such methods, Block 510, Block 520, and Block 540 are performed as described above in connection with FIG. 5. In such methods 700, the UE selects the method for decomposing. Similar to Block 530, the UE selectively decomposes $W_{TRP}$ in both a spatial domain (SD) and a frequency domain (FD) into SD coefficients and FD coefficients based on one or more SD bases and FD bases under UE selection—Block 730. The UE begins by Separately decomposing each $W_{TRP}$ in the SD on channel-specific SD bases—Block 732. The UE then determines whether CSI ports for each TRP are configured in a same CSI reference signal (CSI-RS) resource—Block 734. Upon determining that CSI ports for each TRP are configured in the same CSI-RS resource, the UE Jointly decompose across the $W_{TRP}$ in the FD based on a common FD basis across the TRPs—Block 736. In combination with Block 732, Block 736 is performed consistent with Equation (8). Upon determining that that CSI ports for each TRP are not configured in the same CSI-RS resource, the UE separately decomposes each $W_{TRP}$ in the FD based on channel-specific FD basis—Block 738. In combination with Block 732, Block 738 is performed consistent with Equation (9).

Figure 8:
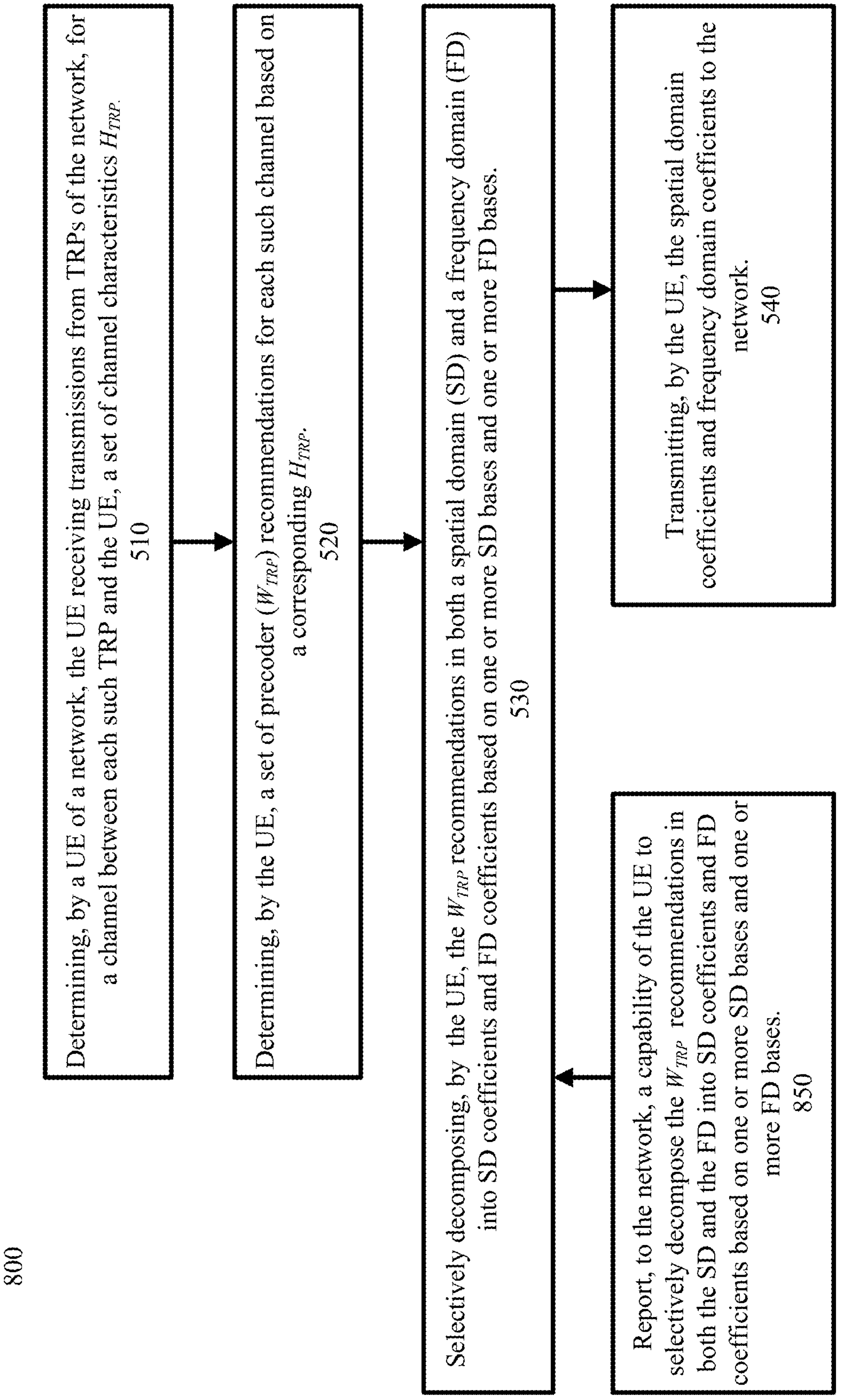
FIG. 8 is a flow diagram illustrating methods of wireless communication, in accordance with examples of the technology disclosed herein.

Referring to FIG. 8 and continuing to refer to prior figures for context, methods 800 for wireless communication are illustrated, in accordance with examples of the technology disclosed herein. In such methods, Block 510, Block 520, Block 530, and Block 540 are performed as described above in connection with FIG. 5. In such methods 800, the UE reports, to the network, a capability of the UE to selectively decompose the $W_{TRP}$ recommendations in both the SD and the FD into SD coefficients and FD coefficients based on one or more SD bases and one or more FD bases—Block 850.

Referring to FIG. 9, and continuing to refer to prior figures for context, UE pre-coder recommendation component 142 includes reporting component 142*f*. In some examples, the reporting component 142*f* reports, to the network, a capability of the UE to selectively decompose the $W_{TRP}$ recommendations in both the SD and the FD into SD coefficients and FD coefficients based on one or more SD bases and one or more FD bases. Accordingly, reporting component 142*f* may provide means for reports, to the network, a capability of the UE to selectively decompose the $W_{TRP}$ recommendations in both the SD and the FD into SD coefficients and FD coefficients based on one or more SD bases and one or more FD bases.

Figure 10:
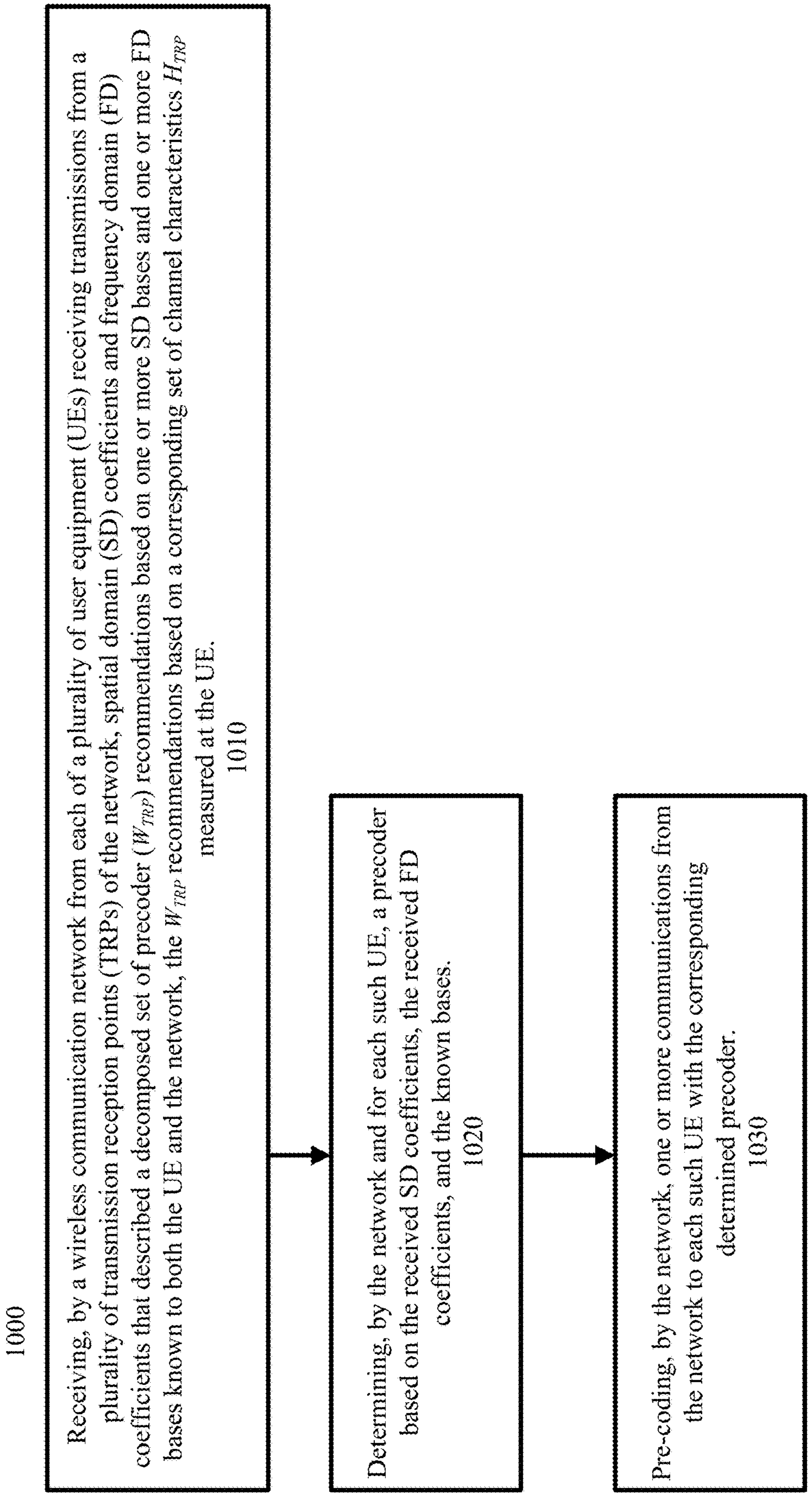
FIG. 10 is a flow diagram illustrating methods of wireless communication, in accordance with examples of the technology disclosed herein.

Referring to FIG. 10, and continuing to refer to prior figures for context, methods 1000 for wireless communication from the base station/network perspective are shown, in accordance with examples of the technology disclosed herein. In such methods 1000, each of a plurality of user equipment (UEs) receiving transmissions from a plurality of transmission reception points (TRPs) of the network. In such methods, a base station/network receives, from such UEs, spatial domain (SD) coefficients and frequency domain (FD) coefficients that described a decomposed set of pre-coder ($W_{TRP}$) recommendations based on one or more SD bases and one or more FD bases known to both the UE and the network—Block 1010. The $W_{TRP}$ recommendations based on a corresponding set of channel characteristics $H_{TRP}$ measured at the UE. In an example, the spatial domain (SD) coefficients and frequency domain (FD) coefficients that described a decomposed set of pre-coder ($W_{TRP}$) recommendations based on one or more SD bases and one or more FD bases known to both the UE and the network were determined according to one of the methods described in conjunction with FIG. 5-FIG. 8.

Figure 12:
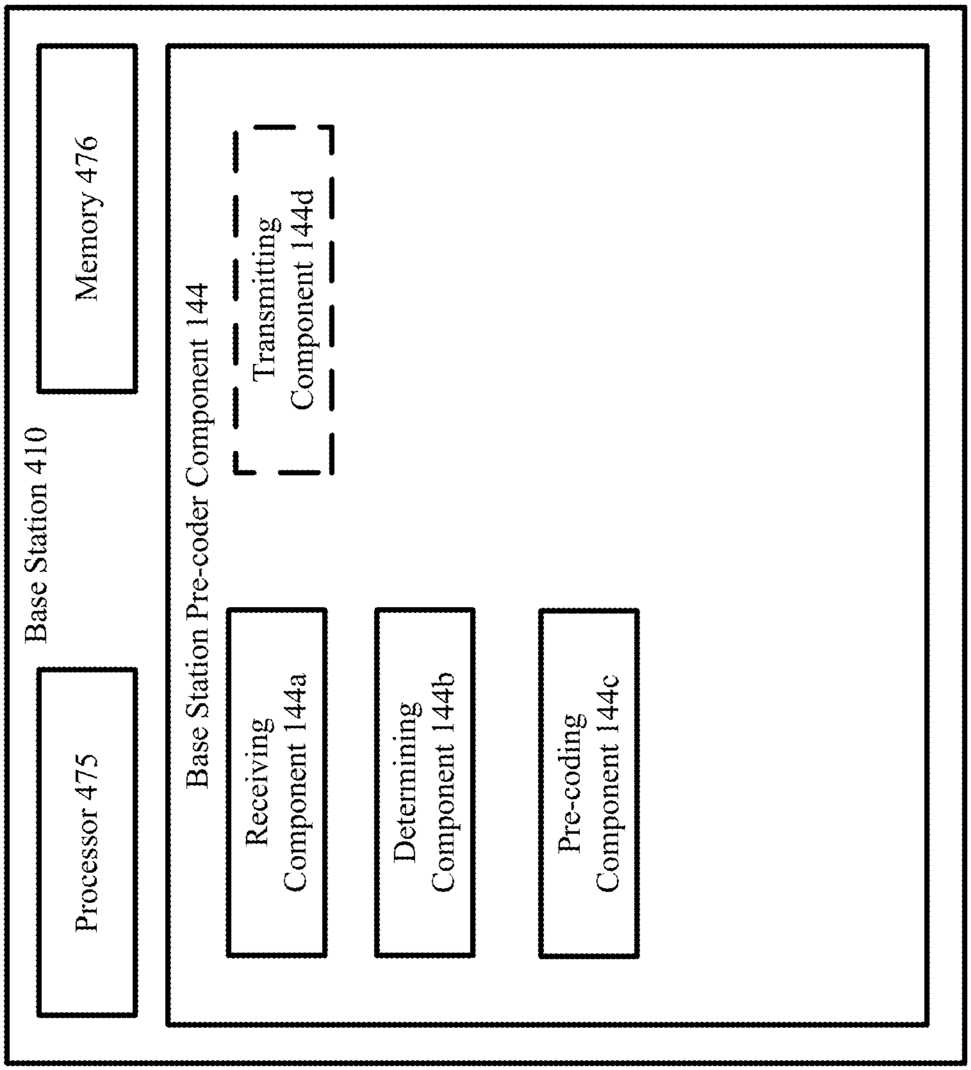
FIG. 12 is a block diagram of a base station, in accordance with examples of the technology disclosed herein.

Referring to FIG. 12, and continuing to refer to prior figures for context, another representation of the base station 410 (such as base station 102) for wireless communication is shown, in accordance with examples of the technology disclosed herein. Base station 410 includes base station pre-coder component 144, controller/processor 475, and memory 476, as described in conjunction with FIG. 4 above. Base station pre-coder component 144 includes receiving component 144*a*. In some examples, the receiving component 144*a* receives, from such a UEs, spatial domain (SD) coefficients and frequency domain (FD) coefficients that described a decomposed set of pre-coder ($W_{TRP}$) recommendations based on one or more SD bases and one or more FD bases known to both the UE and the network. Accordingly, receiving component 144*a* may provide means for receiving, from such a UEs, spatial domain (SD) coefficients and frequency domain (FD) coefficients that described a decomposed set of pre-coder ($W_{TRP}$) recommendations based on one or more SD bases and one or more FD bases known to both the UE and the network.

Referring again to FIG. 10 the network/base station determines, for each such UE, a pre-coder based on the received SD coefficients, the received FD coefficients, and the known bases—Block 1020. Referring to FIG. 12, base station pre-coder component 144 includes determining component 144*b*. In some examples, the determining component 144*b* determines, for each such UE, a pre-coder based on the received SD coefficients, the received FD coefficients, and the known bases. Accordingly, determining component 144*b* may provide means for determining, for each such UE, a pre-coder based on the received SD coefficients, the received FD coefficients, and the known bases.

The base station/network then pre-codes one or more communications from the network to each such UE with the corresponding determined pre-coder—Block 1030. Referring to FIG. 12, base station pre-coder component 144 includes pre-coding component 144*c*. In some examples, the pre-coding component 144*c* pre-codes one or more communications from the network to each such UE with the corresponding determined pre-coder. Accordingly, pre-coding component 144*c* may provide means for pre-coding one or more communications from the network to each such UE with the corresponding determined pre-coder.

Figure 11:
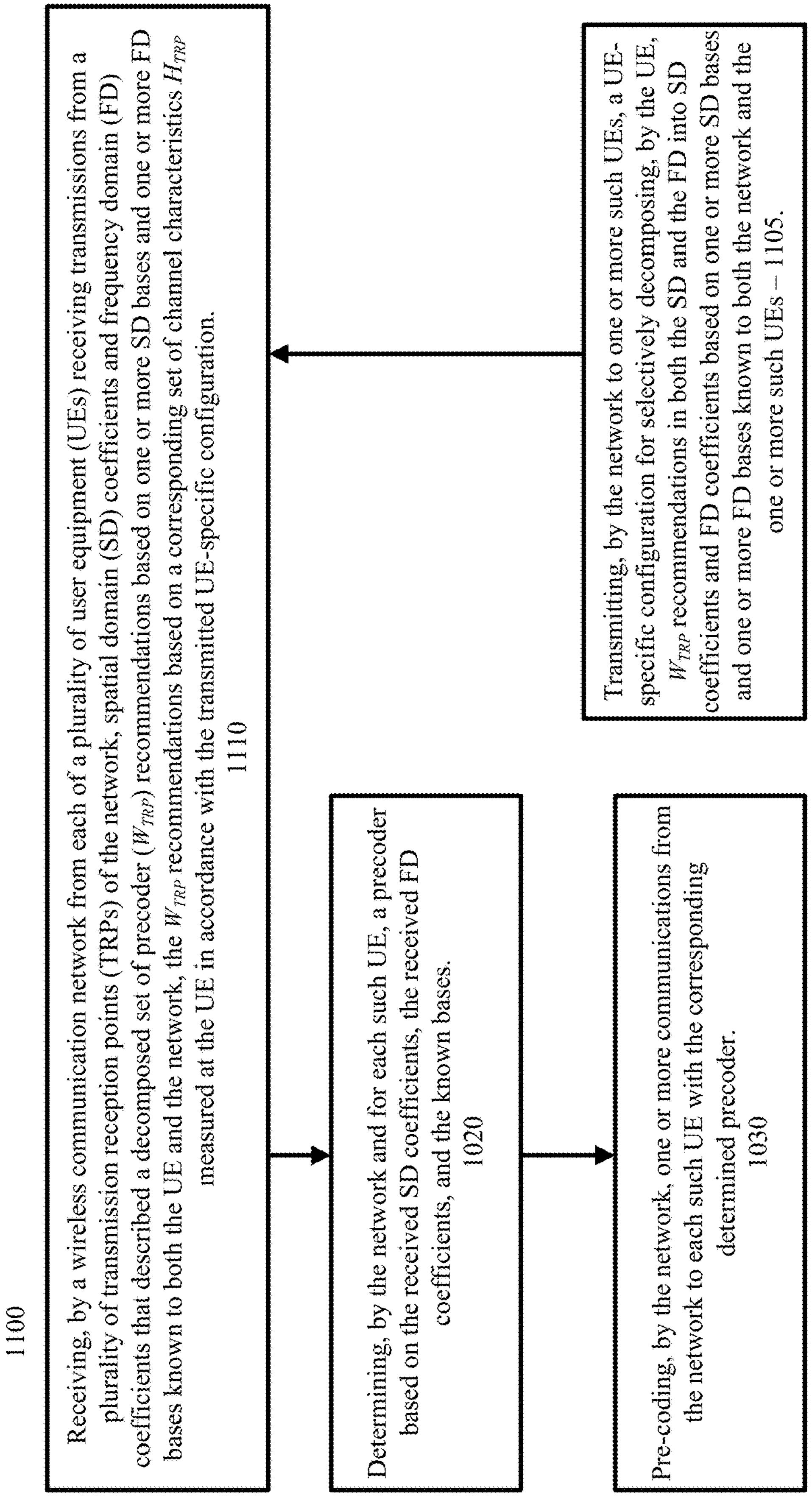
FIG. 11 is a flow diagram illustrating methods of wireless communication, in accordance with examples of the technology disclosed herein.

Referring to FIG. 11 and continuing to refer to prior figures for context, methods 1100 for wireless communication are illustrated, in accordance with examples of the technology disclosed herein. In such methods, Block 1020 and Block 1030 are performed as described above in connection with FIG. 10. In such methods 1100, the network/base station transmits, to one or more such UEs, a UE-specific configuration for selectively decomposing, by the UE, $W_{TRP}$ recommendations in both the SD and the FD into SD coefficients and FD coefficients based on one or more SD bases and one or more FD bases known to both the network and the one or more such UEs—Block 1105. Referring to FIG. 12, base station pre-coder component 144 includes transmitting component 144*d*. In some examples, the transmitting component 144*d* transmits, to one or more such UEs, a UE-specific configuration for selectively decomposing, by the UE, $W_{TRP}$ recommendations in both the SD and the FD into SD coefficients and FD coefficients based on one or more SD bases and one or more FD bases known to both the network and the one or more such UEs. Accordingly, transmitting component 144*d* may provide means for transmitting, to one or more such UEs, a UE-specific configuration for selectively decomposing, by the UE, $W_{TRP}$ recommendations in both the SD and the FD into SD coefficients and FD coefficients based on one or more SD bases and one or more FD bases known to both the network and the one or more such UEs.

The following examples are illustrative only and aspects thereof may be combined with aspects of other embodiments or teaching described herein, without limitation. The technology disclosed herein includes method, apparatus, and computer-readable media including instructions for wireless communication. In aspects of the technology disclosed herein, methods, non-transitory computer readable media, and apparatuses are provided for reporting recommended pre-coder matrices to the network/base station, and for configuring a UE for such reporting. Each example below can be embodied in a non-transitory computer-readable medium storing processor-executable code, the code when read and executed by at least one processor of user equipment (UE) of a network, causes the UE/network/base station (as appropriate) to execute the method of each example. Each example below can be embodied as means for performing the functions of each example below; such means as disclosed herein include, but are not limited to, those described in conjunction with FIG. 4, FIG. 9, and FIG. 12.

Such technology finds use, e.g., where UEs receive transmissions from a plurality of transmission reception points (TRPs) of a network.

In Example 1, the UE determines, for a channel between each such TRP and the UE, a set of channel characteristics ($H_{TRP}$). The UE then determines a set of pre-coder ($W_{TRP}$) recommendations for each such channel based on a corresponding $H_{TRP}$. The UE selectively decomposes the $W_{TRP}$ recommendations in both a spatial domain (SD) and a frequency domain (FD) into SD coefficients and FD coefficients based on one or more SD bases and one or more FD bases. Then the UE transmits the spatial domain coefficients and frequency domain coefficients to the network/base station.

Example 2 includes Example 1, wherein, selectively decomposing includes one of: i) jointly decomposing across the $W_{TRP}$ recommendations in the SD based on a common SD basis matrix across the TRPs, and jointly decomposing across the $W_{TRP}$ recommendations in the FD based on a common FD basis matrix across the TRPs; ii) jointly decomposing across the $W_{TRP}$ recommendations in the SD based on a common SD basis matrix across the TRPs, and separately decomposing each $W_{TRP}$ recommendation in the FD based on channel-specific FD basis matrices; iii) separately decomposing each $W_{TRP}$ recommendation in the SD on channel-specific SD basis matrices, and jointly decomposing across $W_{TRP}$ recommendations in the FD based on a common FD basis matrix across the TRPs; and iv) separately decomposing each $W_{TRP}$ recommendation in the SD on channel-specific SD basis matrices, and separately decomposing each $W_{TRP}$ recommendation in the FD based on channel-specific FD basis matrices.

Example 3 includes one or more of Examples 1-2, in which the UE receives, from the network/base station and prior to the selectively decomposing, instructions for selectively decomposing $W_{TRP}$ recommendations using one of i), ii), iii), and iv). In such examples, selectively decomposing includes selectively decomposing in accordance with the received instructions. Example 4 includes one or more of Examples 1-3. In Example 4, the instructions are received by the UE via a radio resource control (RRC) message to the UE from the network/base station.

Example 5 includes one or more of Examples 1-4. In Example 5, decomposing is selected by the UE. In some such examples, the UE selects separately decomposing each $W_{TRP}$ recommendation in the SD on channel-specific SD bases. The UE determines whether channel state information (CSI) ports for each TRP are configured in a same CSI reference signal (CSI-RS) resource. The UE selects jointly decomposing across the $W_{TRP}$ recommendations in the FD based on a common FD basis across the TRPs upon determining that CSI ports for each TRP are configured in the same CSI-RS resource; and selects separately decomposing each $W_{TRP}$ recommendation in the FD based on channel-specific FD basis upon determining that that CSI ports for each TRP are not configured in the same CSI-RS resource.

Example 6 includes one or more of Examples 1-5. In Example 6, the UE reports, to the network/base station, a capability of the UE to selectively decompose the $W_{TRP}$ recommendations in both the SD and the FD into SD coefficients and FD coefficients based on one or more SD bases and one or more FD bases.

From the perspective of the network/base station, methods, apparatus, and computer-readable media including instructions for wireless communication are included in the technology disclosed herein. In Example 8, a network/base station receives, from each of a plurality of UEs receiving transmissions from a plurality of TRPs of the network, SD coefficients and FD coefficients that described a decomposed set of $W_{TRP}$ recommendations based on one or more SD bases and one or more FD bases known to both the UE and the network. The $W_{TRP}$ recommendations are based on a corresponding set of channel characteristics $H_{TRP}$ measured at the UE. The network determines, for each such UE, a pre-coder based on the received SD coefficients, the received FD coefficients, and the known bases. The network/base station then pre-codes one or more communications from the network/base station to each such UE with the corresponding determined pre-coder. Example 8 includes Example 7. In Example 8, the network/base station transmits, to one or more such UEs, a UE-specific configuration for selectively decomposing, by the UE, $W_{TRP}$ recommendations in both the SD and the FD into SD coefficients and FD coefficients based on one or more SD bases and one or more FD bases known to both the network/base station and the one or more such UEs. In such examples, the network/base station receives subsequent SD coefficients and FD coefficients based on the transmitted UE-specific configuration. Example 9 includes one or more of Examples 7-8. In Example 9, the transmitting includes transmitting in an RRC message.

In Example 10, a UE receiving transmissions from a plurality of transmission reception points (TRPs) of the network, determines, for a channel between each such TRP and the UE, a set of channel characteristics (HTRP). The UE determines, for each such channel, a set of spatial domain (SD) coefficients and frequency domain (FD) coefficients as pre-coder (WTRP) recommendations for each such channel based on both i) a corresponding HTRP, and ii) on one or more SD bases and one or more FD bases known to the UE and to the network.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A method of wireless communication, comprising:

determining, by a user equipment (UE) of a network, the UE receiving transmissions from a plurality of transmission reception points (TRPs) of the network, for a channel between each such TRP and the UE, a set of channel characteristics ($H_{TRP}$);

determining, by the UE, a set of pre-coder ($W_{TRP}$) recommendations for each such channel based on a corresponding $H_{TRP}$;

selectively decomposing, by the UE, the $W_{TRP}$ recommendations in both a spatial domain (SD) and a frequency domain (FD) into SD coefficients and FD coefficients based on one or more SD bases and one or more FD bases; and transmitting, by the UE, the spatial domain coefficients and frequency domain coefficients to the network.

2. The method of claim 1, wherein selectively decomposing comprises one of:

i) jointly decomposing across the $W_{TRP}$ recommendations in the SD based on a common SD basis matrix across the TRPs, and jointly decomposing across the $W_{TRP}$ recommendations in the FD based on a common FD basis matrix across the TRPs;

ii) jointly decomposing across the $W_{TRP}$ recommendations in the SD based on a common SD basis matrix across the TRPs, and separately decomposing each $W_{TRP}$ recommendation in the FD based on channel-specific FD basis matrices;

iii) separately decomposing each $W_{TRP}$ recommendation in the SD on channel-specific SD basis matrices, and jointly decomposing across $W_{TRP}$ recommendations in the FD based on a common FD basis matrix across the TRPs; and iv) separately decomposing each $W_{TRP}$ recommendation in the SD on channel-specific SD basis matrices, and separately decomposing each $W_{TRP}$ recommendation in the FD based on channel-specific FD basis matrices.

3. The method of claim 2:

further comprising receiving, from the network and prior to selectively decomposing, instructions for selectively decomposing $W_{TRP}$ recommendations using one of i), ii), iii), and iv); and the selectively decomposing comprises selectively decomposing in accordance with the received instructions.

4. The method of claim 3, wherein the instructions are received by the UE via a radio resource control (RRC) message to the UE from the network.

5. The method of claim 1, wherein the decomposing is selected by the UE.

6. The method of claim 5, wherein the UE:

selects separately decomposing each $W_{TRP}$ recommendation in the SD on channel-specific SD bases;

determines whether channel state information (CSI) ports for each TRP are configured in a same CSI reference signal (CSI-RS) resource;

selects jointly decomposing across the $W_{TRP}$ recommendations in the FD based on a common FD basis across the TRPs upon determining that CSI ports for each TRP are configured in the same CSI-RS resource; and selects separately decomposing each $W_{TRP}$ recommendation in the FD based on channel-specific FD basis upon determining that that CSI ports for each TRP are not configured in the same CSI-RS resource.

7. The method of claim 1, further comprising:

reporting, by the UE to the network, a capability of the UE to selectively decompose the $W_{TRP}$ recommendations in both the SD and the FD into SD coefficients and FD coefficients based on one or more SD bases and one or more FD bases.

8. A user equipment (UE) of a wireless communications network, comprising:

a memory; and at least one processor coupled to the memory, the memory including instructions executable by the at least one processor to cause the UE to:

determine, for the UE receiving transmissions from a plurality of transmission reception points (TRPs) of the network and for a channel between each such TRP and the UE, a set of channel characteristics ($H_{TRP}$);

determine a set of pre-coder ($W_{TRP}$) recommendations for each such channel based on a corresponding $H_{TRP}$;

selectively decompose the $W_{TRP}$ recommendations in both a spatial domain (SD) and a frequency domain (FD) into SD coefficients and FD coefficients based on one or more SD bases and one or more FD bases; and transmit the spatial domain coefficients and frequency domain coefficients to the network.

9. The UE of claim 8, wherein the UE is caused to selectively decompose by performing one of:

i) jointly decomposing across the $W_{TRP}$ recommendations in the SD based on a common SD basis matrix across the TRPs, and jointly decomposing across the $W_{TRP}$ recommendations in the FD based on a common FD basis matrix across the TRPs;

ii) jointly decomposing across the $W_{TRP}$ recommendations in the SD based on a common SD basis matrix across the TRPs, and separately decomposing each $W_{TRP}$ recommendation in the FD based on channel-specific FD basis matrices;

iii) separately decomposing each $W_{TRP}$ recommendation in the SD on channel-specific SD basis matrices, and jointly decomposing across $W_{TRP}$ recommendations in the FD based on a common FD basis matrix across the TRPs; and iv) separately decomposing each $W_{TRP}$ recommendation in the SD on channel-specific SD basis matrices, and separately decomposing each $W_{TRP}$ recommendation in the FD based on channel-specific FD basis matrices.

10. The UE of claim 9, wherein:

the memory further includes instructions executable by the at least one processor to cause the UE to further receive, from the network and prior to selectively decomposing, instructions for selectively decomposing $W_{TRP}$ recommendations using one of i), ii), iii), and iv); and the selectively decomposing comprises selectively decomposing in accordance with the received instructions for selectively decomposing $W_{TRP}$ recommendations.

11. The UE of claim 10, wherein the instructions for selectively decomposing $W_{TRP}$ recommendations are received by the UE via a radio resource control (RRC) message to the UE from the network.

12. The UE of claim 8, wherein the decomposing is selected by the UE.

13. The UE of claim 12, wherein the memory further includes instructions executable by the at least one processor to cause the UE to selectively decompose $W_{TRP}$ recommendations by:

selecting separately decomposing each $W_{TRP}$ recommendation in the SD on channel-specific SD bases;

determining whether channel state information (CSI) ports for each TRP are configured in a same CSI reference signal (CSI-RS) resource;

selecting joint decomposition across the $W_{TRP}$ recommendations in the FD based on a common FD basis across the TRPs upon determining that CSI ports for each TRP are configured in the same CSI-RS resource; and selecting separate decomposition for each $W_{TRP}$ recommendation in the FD based on channel-specific FD basis upon determining that that CSI ports for each TRP are not configured in the same CSI-RS resource.

14. The UE of claim 8, wherein the memory further includes instructions executable by the at least one processor to cause the UE to:

report, by the UE to the network, a capability of the UE to selectively decompose the $W_{TRP}$ recommendations in both the SD and the FD into SD coefficients and FD coefficients based on one or more SD bases and one or more FD bases.

15. A method of wireless communication, comprising:

receiving, by a wireless communication network from each of a plurality of user equipment (UEs) receiving transmissions from a plurality of transmission reception points (TRPs) of the network, spatial domain (SD) coefficients and frequency domain (FD) coefficients that describe a decomposed set of pre-coder ($W_{TRP}$) recommendations based on one or more SD bases and one or more FD bases known to both the UE and the network, the $W_{TRP}$ recommendations based on a corresponding set of channel characteristics $H_{TRP}$ measured at the UE;

determining, by the network and for each such UE, a pre-coder based on the received SD coefficients, the received FD coefficients, and the known bases; and pre-coding, by the network, one or more communications from the network to each such UE with the corresponding determined pre-coder.

16. The method of claim 15, further comprising:

transmitting, by the network to one or more such UEs, a UE-specific configuration for selectively decomposing, by the UE, $W_{TRP}$ recommendations in both the SD and the FD into SD coefficients and FD coefficients based on one or more SD bases and one or more FD bases known to both the network and the one or more such UEs; and receiving, by the network, subsequent SD coefficients and FD coefficients based on the transmitted UE-specific configuration.

17. The method of claim 16, wherein the transmitting comprises transmitting in a radio resource control (RRC) message.

18. A device, comprising:

a memory; and at least one processor coupled to the memory, the memory including instructions executable by the at least one processor to cause the device to:

receive, by a wireless communication network from each of a plurality of user equipment (UEs) receiving transmissions from a plurality of transmission reception points (TRPs) of the network, spatial domain (SD) coefficients and frequency domain (FD) coefficients that describe a decomposed set of pre-coder ($W_{TRP}$) recommendations based on one or more SD bases and one or more FD bases known to both the UE and the network, the $W_{TRP}$ recommendations based on a corresponding set of channel characteristics $H_{TRP}$ measured at the UE;

determine, by the network and for each such UE, a pre-coder based on the received SD coefficients, the received FD coefficients, and the known bases; and pre-code, by the network, one or more communications from the network to each such UE with the corresponding determined pre-coder.

19. The device of claim 18, wherein the memory further includes instructions executable by the at least one processor to cause the device to:

transmit, by the network to one or more such UEs, a UE-specific configuration for selectively decomposing, by the UE, $W_{TRP}$ recommendations in both the SD and the FD into SD coefficients and FD coefficients based on one or more SD bases and one or more FD bases known to both the network and the one or more such UEs; and receive, by the network, subsequent SD coefficients and FD coefficients based on the transmitted UE-specific configuration.

20. The device of claim 19, wherein the transmitting comprises transmitting in a radio resource control (RRC) message.

* * * * *